US011933317B2

(12) United States Patent
Ballesteros

(10) Patent No.: US 11,933,317 B2
(45) Date of Patent: Mar. 19, 2024

(54) LOW-FLOW FLUID DELIVERY SYSTEM AND LOW-FLOW DEVICE THEREFOR

(71) Applicant: Jonathan Ballesteros, Montrose, CO (US)

(72) Inventor: Jonathan Ballesteros, Montrose, CO (US)

(73) Assignee: GEYSER TECHNOLOGIES, LLC, Montrose, CO (US)

(*) Notice: Subject to any disclaimer, the term of this patent is extended or adjusted under 35 U.S.C. 154(b) by 209 days.

(21) Appl. No.: 16/465,470

(22) PCT Filed: Mar. 21, 2018

(86) PCT No.: PCT/US2018/023470

§ 371 (c)(1),
(2) Date: May 30, 2019

(87) PCT Pub. No.: WO2018/175523

PCT Pub. Date: Sep. 27, 2018

(65) Prior Publication Data

US 2020/0063758 A1 Feb. 27, 2020

Related U.S. Application Data

(60) Provisional application No. 62/707,592, filed on Nov. 9, 2017, provisional application No. 62/605,425, filed on Aug. 14, 2017.

(30) Foreign Application Priority Data

Mar. 22, 2017 (AU) ................................ 2017901021
Mar. 23, 2017 (AU) ................................ 2017901022
Jul. 3, 2017 (AU) ................................ 2017902571

(51) Int. Cl.
*F04D 29/60* (2006.01)
*B08B 3/02* (2006.01)
*F04B 49/06* (2006.01)

(52) U.S. Cl.
CPC .............. *F04D 29/605* (2013.01); *B08B 1/12* (2024.01); *B08B 3/02* (2013.01); *F04B 49/06* (2013.01);

(Continued)

(58) Field of Classification Search
CPC ............... F04D 15/0066; F04D 29/605; F04B 2205/04; F04B 2205/09; F04B 2203/0208;

(Continued)

(56) References Cited

U.S. PATENT DOCUMENTS 1,181,594 A 5/1916 Hinkle
5,154,524 A * 10/1992 Anderson .............. A47L 13/17 401/289

(Continued)

FOREIGN PATENT DOCUMENTS

CA 2437426 2/2005
CN 201521001 7/2010

(Continued)

OTHER PUBLICATIONS

CN Office Action issued to CN 201880020235.3 dated Aug. 4, 2021, 13 pages.

(Continued)

*Primary Examiner* — Philip E Stimpert
(74) *Attorney, Agent, or Firm* — K&L Gates LLP

(57) ABSTRACT

Low-flow fluid delivery system. The system includes a pump assembly comprising a pump mechanism having an inlet side and an outlet side, wherein the inlet side is configured to fluidly couple to a fluid supply. The system (Continued)

further includes a pressure sensor operably coupled to the outlet side and configured to measure a fluid pressure at the outlet side. An actuator mechanically is coupled to the pump mechanism to drive the pump mechanism. A controller is coupled to the pressure sensor, wherein the controller is configured with a preselected set of fluid pressure set points and one or more preselected sets of fluid flow rates and wherein the controller is further configured to control the actuator to increase a fluid flow rate to a first flow rate in the preselected set of fluid flow rates when the fluid pressure at the outlet side falls to a lower one of corresponding fluid pressure set point in the preselected set of fluid pressure set points. The controller is further configured to control the actuator to reduce the fluid flow rate to a second fluid flow rate in the preselected set of fluid flow rates, when the fluid pressure at the outlet side rises to an upper one of a corresponding fluid pressure set point in the preselected set of fluid pressure set points.

16 Claims, 11 Drawing Sheets

(52) U.S. Cl.
CPC ... *F04B 2203/0208* (2013.01); *F04B 2205/04* (2013.01)

(58) Field of Classification Search
CPC . F04B 49/022; B08B 1/001–006; B08B 3/02; A47K 7/04–046
USPC .................................................. 401/203, 204
See application file for complete search history.

(56) References Cited

U.S. PATENT DOCUMENTS 5,538,396 A * 7/1996 Meierhoefer ............. F04D 3/00 417/19
5,883,489 A * 3/1999 Konrad ................... H02P 23/08 318/807
6,099,264 A 8/2000 Du
6,164,496 A 12/2000 Gregory
6,167,965 B1 * 1/2001 Bearden .................. F04D 9/002 166/250.15
6,250,564 B1 6/2001 Chahley
6,257,246 B1 7/2001 Kan
6,264,119 B1 7/2001 Truong
6,497,554 B2 12/2002 Yang et al.
6,675,988 B2 1/2004 Cline et al.
6,688,855 B2 2/2004 Beckerman
6,729,849 B2 5/2004 Fong
6,805,305 B2 10/2004 Schlosser et al.
7,261,108 B2 8/2007 Dallianis et al.
7,509,925 B2 3/2009 Embry
7,537,025 B2 5/2009 Kuna et al.
7,614,412 B2 11/2009 Yamaguchi
7,901,190 B2 3/2011 Gray
7,987,533 B2 8/2011 Phipps et al.
8,082,886 B2 12/2011 Hurwitz
8,302,394 B2 11/2012 Ochi
8,337,166 B2 12/2012 Meza et al.
8,403,578 B2 * 3/2013 Burhans .............. A47L 15/0089 401/27
8,425,202 B2 4/2013 Walls
8,444,416 B2 5/2013 Chenvainu
8,500,046 B2 8/2013 Gilpatrick et al.
8,641,383 B2 2/2014 Meza et al.
8,920,131 B2 12/2014 Aspen
8,960,565 B2 2/2015 Rohner et al.
9,303,394 B2 4/2016 Mock et al.
9,359,748 B1 6/2016 Lamy et al.
9,387,495 B2 7/2016 Schumacher et al.
9,539,591 B2 1/2017 Raab et al.
9,839,283 B2 12/2017 Tatu et al.
2003/0223876 A1 12/2003 Anderson et al.
2005/0031404 A1 2/2005 Tsai et al.
2006/0168746 A1 * 8/2006 Guyuron .................. A47K 7/04 15/23
2008/0128006 A1 6/2008 Mayer et al.
2008/0317608 A1 12/2008 Gray
2009/0113619 A1 5/2009 Tichenor et al.
2010/0243086 A1 * 9/2010 Gilpatrick ............. B05B 12/085 137/565.01
2012/0039723 A1 * 2/2012 Gresham ............... F04B 49/022 417/44.2
2013/0276839 A1 10/2013 Yoo
2014/0037467 A1 2/2014 Raasch
2015/0159657 A1 6/2015 Roussel et al.
2016/0022395 A1 * 1/2016 Chang .................. A61C 17/028 433/82
2016/0256900 A1 9/2016 Aono et al.
2017/0071325 A1 3/2017 Wu et al.
2017/0107702 A1 4/2017 Dissing et al.
2017/0108882 A1 4/2017 Dissing et al.
2017/0122304 A1 5/2017 Funabashi et al.
2017/0245630 A1 8/2017 Moskovich et al.
2017/0320081 A1 11/2017 Heuckeroth

FOREIGN PATENT DOCUMENTS

CN 102361699 2/2012
CN 102755972 10/2012
CN 103263985 8/2013
CN 103557207 2/2014
CN 203620818 6/2014
JP 1982191485 11/1982
JP 1982191485 11/1983
JP 1999257234 9/1999
JP 2005120925 5/2005
JP 2005120925 A 5/2005
JP 2016087511 5/2016
WO 2010111185 9/2010

OTHER PUBLICATIONS

European Search Report for related European Application No. EP18771538; action dated Jul. 24, 2020; (4 pages).
International Preliminary Report on Patentability for PCT Application No. PCT/US2018/023470 dated Sep. 24, 2019.
Extended Search Report issued to European Patent Application No. 18771538.8, dated Oct. 27, 2020, 14 pages.
Office Action issued in related CN Application No. 201880020235.3 dated Dec. 20, 2021, 14 pages.
Spxflow; "Flow Master Water Pressure System", Instruction Manual, Mar. 2016.
Johnson Pump: "AquaJetMini Instruction Manual".
Singflo: "Installation for FLO Series Industrial Pumps".
Office Action issued to Japanese Patent Application No. 2019-552604, dated Feb. 15, 2022, 15 pages (with English Translation).
Office Action issued to related IL Application No. 269383 dated Mar. 29, 2022, 4 pages.
Office Action issued to related EP Application No. 18771538.8, dated Oct. 19, 2022, 6 pages.
Office Action issued to related BR Application No. 112019019726-5, dated Jul. 19, 2022, 3 pageds.
Examination Report issued to related AU Application No. 2018237126, dated Nov. 3, 2022, 4 pages.
Office Action issued to related JP Application No. 2019-552604 dated Jul. 12, 2022, 12 pages (with English translation).
Examination Report issued to related AU Application No. 2018237126, dated May 15, 2023, 3 pages.
BR Office Action issued to related BR Application No. BR112019019726-5 dated Mar. 7, 2023, 5 pages.
Office Action issued to related Mexican Patent MX/a/2019/011190, dated Jul. 6, 2023.

(56) References Cited

OTHER PUBLICATIONS

Examination Report issued to related CA application No. 3056245 dated Oct. 16, 2023, 4 pages.

* cited by examiner

LOW-FLOW FLUID DELIVERY SYSTEM AND LOW-FLOW DEVICE THEREFOR

CROSS-REFERENCE TO RELATED APPLICATIONS

This application claims the benefit of Australian Provisional Application Serial No. 2017901021 filed Mar. 22, 2017 and titled "Flowing Sponge"; Australian Provisional Application Serial No. 2017901022 filed Mar. 23, 2017 and titled "Low Flow Portable Washing System"; Australian Provisional Patent Application Serial No. 2017902571 filed Jul. 3, 2017 and titled "Low Flow Portable Washing System with Near-Zero Pressure Cycles"; U.S. Provisional Application Ser. No. 62/605425 filed Aug. 14, 2017 and titled "Low Flow Portable Washing System with Near-Zero Pressure Cycles"; and U.S. Provisional Application Ser. No. 62/707592 filed Nov. 9, 2017 and titled "Low Flow Devices with Diffusors, Dispensers, and Automatic Shutoff Valves". The provisional applications are incorporated by reference herein as if reproduced in full below.

BACKGROUND

Portable washing or cleaning systems such as public showers, gravity shower bags, tap water lines with hoses, and electric water pumps with shower heads include outlets or spouts that require high flow rates to effectively deliver sufficient water to allow the user to effectively clean, wash, or remove undesirable materials from an item or the user's body. This requires large amounts of water be available and consumed. This also requires resources to heat, transport, carry, store, or treat water which may be unavailable or impractical. Consequently, there is a need in the art for low-flow washing systems, including washing or cleaning devices for scrubbing, combing, brushing and the like that may be used for mechanical cleaning of an item or person.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
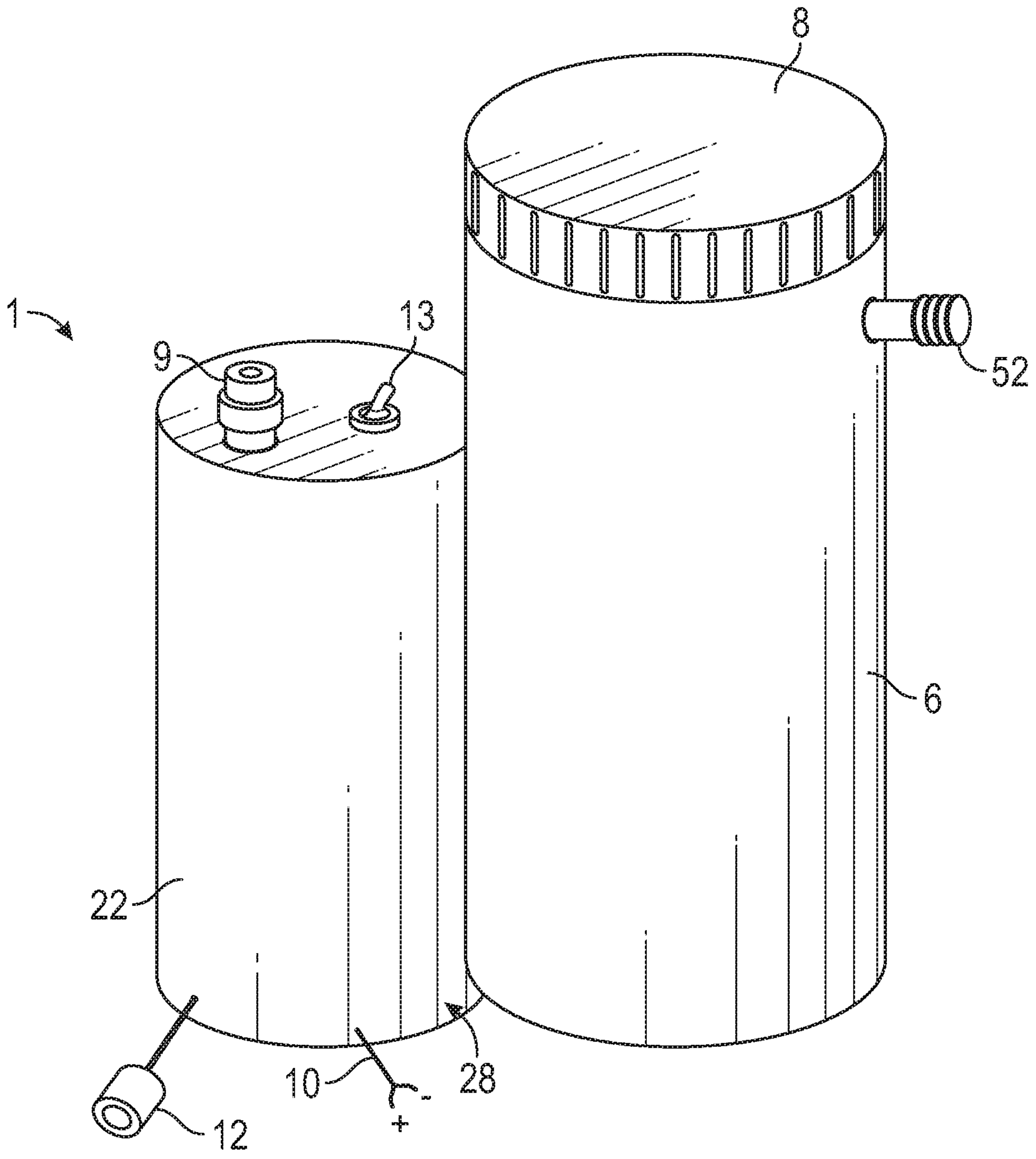
FIG. 1 shows a pump assembly in accordance with at least some embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection unless expressly described as a direct connection. Thus, if a first device couples to a second device, that connection may be through a direct electrical connection, through an indirect electrical connection via other devices and connections, through an optical electrical connection, or through a wireless electrical connection. Likewise, in the context of a fluid, the term couple or couples is intended to mean either an indirect, direct fluid connection unless expressly described as a direct connection. Thus, if a first device couples to a second device, that connection may be through a direct fluid connection or through an indirect fluid connection via other devices and connections.

"About" as used herein in conjunction with a numerical value shall mean the recited numerical value as may be determined accounting for generally accepted variation in measurement, manufacture and the like in the relevant industry.

"Exemplary means "serving as an example, instance, or illustration." An embodiment described herein as "exemplary" is not necessarily to be construed as preferred or advantageous over other embodiments.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. In the following description, numerous specific details are set forth such as specific fluid pressure set points, fluid flow rates and physical dimensions to provide a thorough understanding of the present invention. However, it will be apparent to those skilled in the art that the present invention may be practiced without such specific details. In other instances, well-known circuits, such as power supplies or power sources have been omitted so as not to obscure the descriptions in unnecessary detail in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference number through the several views.

FIG. 1 shows a pump assembly 1 in accordance with an example embodiment. Pump assembly 1 may be used to deliver a fluid for low-flow washing or cleaning applications as described further hereinbelow. Fluids that may be used in conjunction with pump assembly 1 include, but are not limited to water (either treated or untreated) and washing solutions which may, for example comprise water altered to enhance the effectiveness of water as a cleansing fluid, and/or minimize the use of water. In at least some embodiments, a washing solution may be by mixing a "washing concentrate" and water within pump assembly 1 or a low-flow device such as are further described hereinbelow. This can be achieved in a variety of ways, including but not limited to, mixing the concentrate into a vessel containing a volume of water or dripping concentrate into a tube conveying flowing water. Washing concentrates can be made of, but are not limited to, a blend of sugar, salt, acid, water soluble methylated alcohol, fragrance-enhancing oil, moisturizing oil, and/or other additives. Washing concentrates can exist in a variety of forms including, but not limited to liquid, solid, viscous, or non-homogenous. A variety of washing solutions can exist for a variety of purposes including but not limited to the item being washed, the user's preference, or the low-flow device selected. For example, a non-lathering washing solution can be used to replace today's typical lathering soaps or shampoos. This can mitigate the excessive amounts of water that are typically required for rinsing lather. Another type of washing solution can be safely left on the washed item (e.g. dishes, skin, hair). This also reduces excessive amounts of water required to rinse the item. Another type of washing solution, in conjunction with a low-flow device comprising a wet comb, described further below, can improve and/or assist the detangling of hair. Another example is a solid washing solution designed to dissolve at a rate correlated with the activity of pump assembly 1 which may thus leverage a "near-zero pressure cycle" of pump assembly 1, which is also described hereinbelow. An example of a commercially available solid concentrate is Aroma Sense's handheld vitamin C Eucalyptus cartridge.

Figure 4:
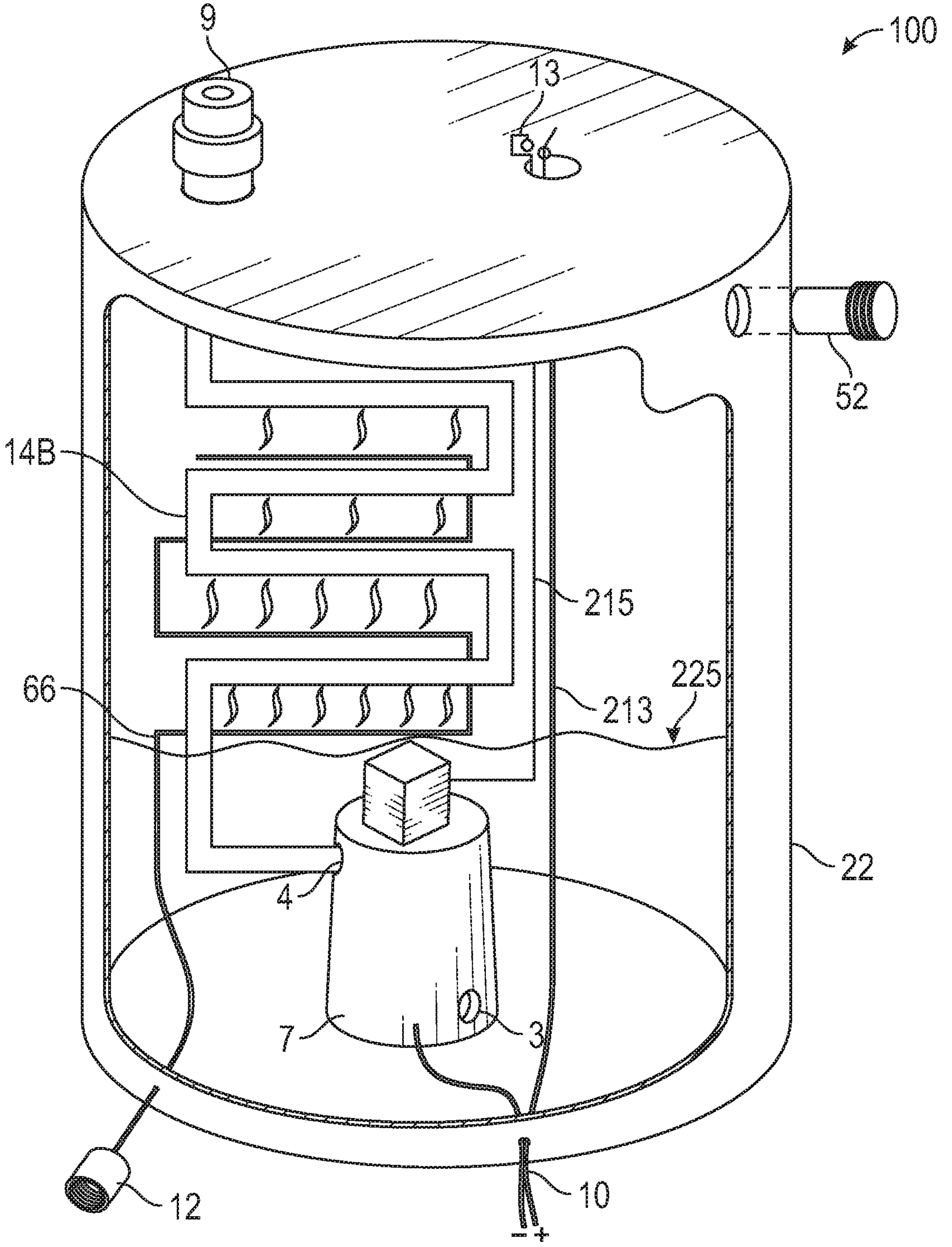
FIG. 4 shows a pump assembly in accordance with at least some embodiments.

Pump assembly 1 includes a vessel 6, a lid 8, switch 13, coupler 9, electrical wires 10, an gas inlet 12 to couple a gas supply to a heater, as described in conjunction with FIG. 4, and a pump housing 22. Vessel 6 holds the fluid supply to be delivered by pump assembly 1. Lid 8 may be fitted to vessel 6 to prevent spillage of the fluid and/or the introduction of dirt or debris into the fluid supply, for example. Alternatively, a plug (not shown in FIG. 1) may be used. An inlet 52 may be included to allow for fluid to be supplied to vessel 6. Electrical wires 10 pass through outer wall 28 of pump housing 22 and supply electrical power to a pump (not shown in FIG. 1) in an interior of pump housing 22. Any suitable source of electrical power may be used. For example, in portable applications, 12 VDC from a vehicle battery may be appropriate with the pump operating voltage corresponding thereto. It would be appreciated by those skilled in the art that other electrical power sources may be used in conjunction with the principles of the disclosure. In at least some embodiments a pump operable from dual or multiple power supplies, such as 12 VDC and 120 VAC, may be used, and a user-operated switch to select between them may be provided (not shown in FIG. 1).

Figure 2:
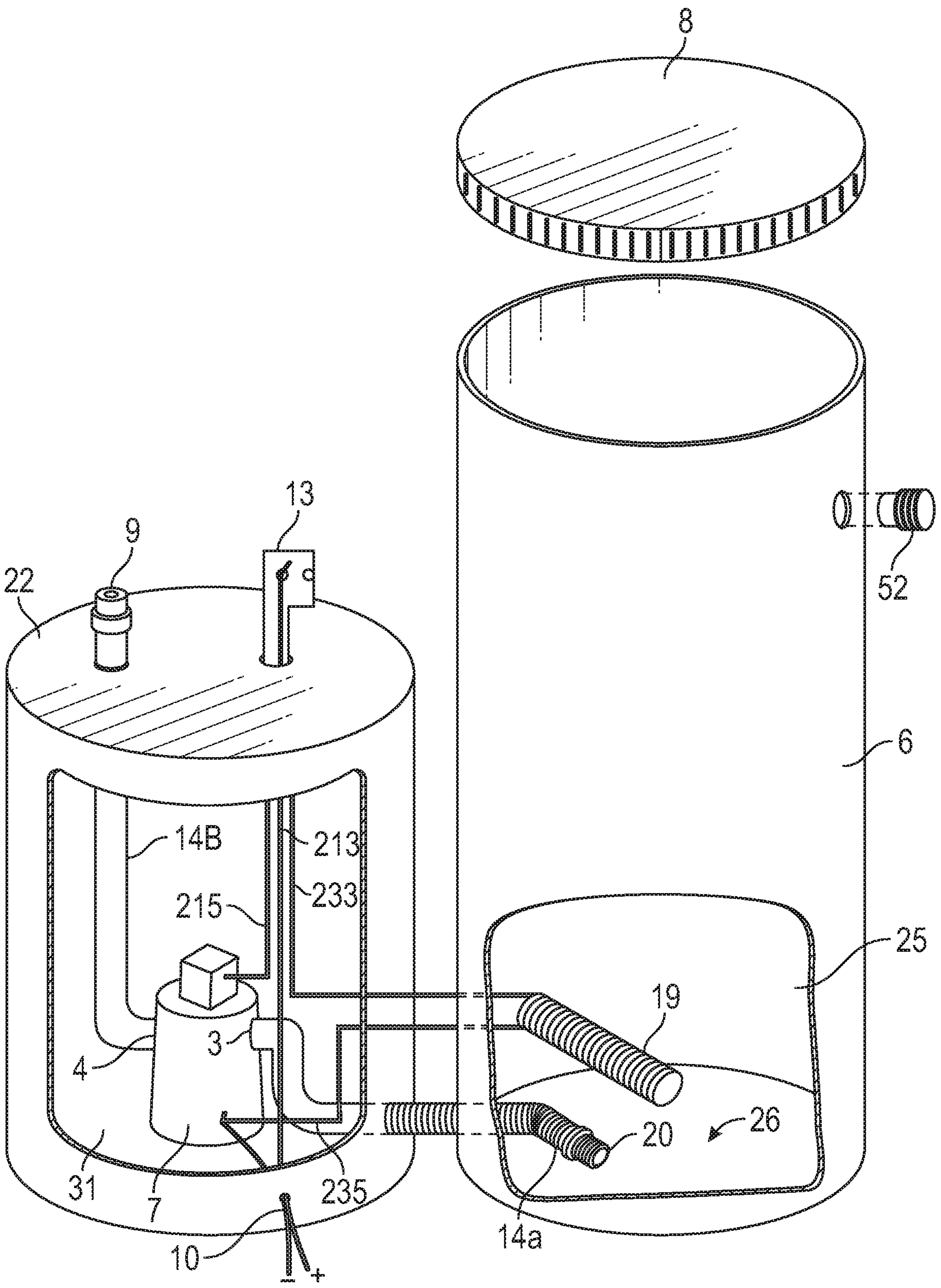
FIG. 2 shows the pump assembly of FIG. 1 in further detail.

FIG. 2 shows pump assembly 1 in further detail. Vessel 6 includes an interior volume 25 configured to hold a volume of fluid as described above. In at least some embodiments, vessel 6 may be connected to a water source (not shown in FIG. 2) such as a tap, well, reservoir, stock tank, desalination system, water purification/treatment system (for example, reverse osmosis, ion exchange resin, or nanofiltration system, sedimentation filter or carbon filter) or the like. An inlet 52 may be provided in vessel 6 to connect the interior volume 25 to a water supply. A heating element 19 may be provided near the bottom 26 of interior volume 25 such that heating element 19 is in thermal contact with interior volume 25. Heating element 19 may be connected to an external electrical power source (not shown in FIG. 2) via switch 13 and wire 233. One terminal of switch 13 is connected to one of electrical wires 10, which may be, for example, the positive pole of an external electrical power source (not shown in FIG. 2), as described further in conjunction with FIG. 3. The same pole may be electrically coupled to pump 7 via electrical wire 215. The circuit between heating element 19 and the external power source is completed via wire 235 which may be coupled to a second one of wires 10 coupled to an opposite pole of the external power source. An operating voltage of heating element 19 may be selected to correspond to the external electrical power source. Alternatively, in at least some embodiments, heating element 19 may be energized by a flame from a hydrocarbon source such as natural gas, propane or butane. Pump assembly 1 includes pump 7 disposed within interior volume 31 of housing 22. The operating voltage of heating element 19 may be selected to be the same as that of pump 7 as previously described. Inlet 3 of pump 7 is fluidly coupled to vessel 6 via inlet tubing 14A which may be include a filter 20 disposed within to filter or treat the fluid disposed within interior volume 25 prior to entering pump 7. As previously described, in at least some embodiments, vessel 6 may be supplied from a water source via an inlet 52. In still other embodiments, vessel 6 may be omitted, and inlet 3 of pump 7 may be coupled directly to the water source (not shown in FIG. 2). Fluid is pumped from pump 7 via outlet 4 to which outlet tubing 14B is coupled. The fluid is transported via outlet tubing 14B to a low-flow device (not shown in FIG. 2) via coupler 9 fluidly connected to outlet tubing 14B. In some embodiments, additional components (not shown in FIG. 2) may be fluidly coupled between outlet 4 of pump 7 and the low flow device, depending on the application. For example a pressure regulator, or accumulator may be used in some applications, such as a camper trailer. Other devices (not shown in FIG. 2) that may be fluidly coupled between outlet 4 and a low-flow device, depending on the application include, but are not limited to flow restrictors, backflow preventers, automatic shutoff timers, water heaters, and ultraviolet sterilization chambers. The transport of fluid to a low-flow device via coupler 9, is described by way of example in conjunction with FIG. 8.

Figure 3:
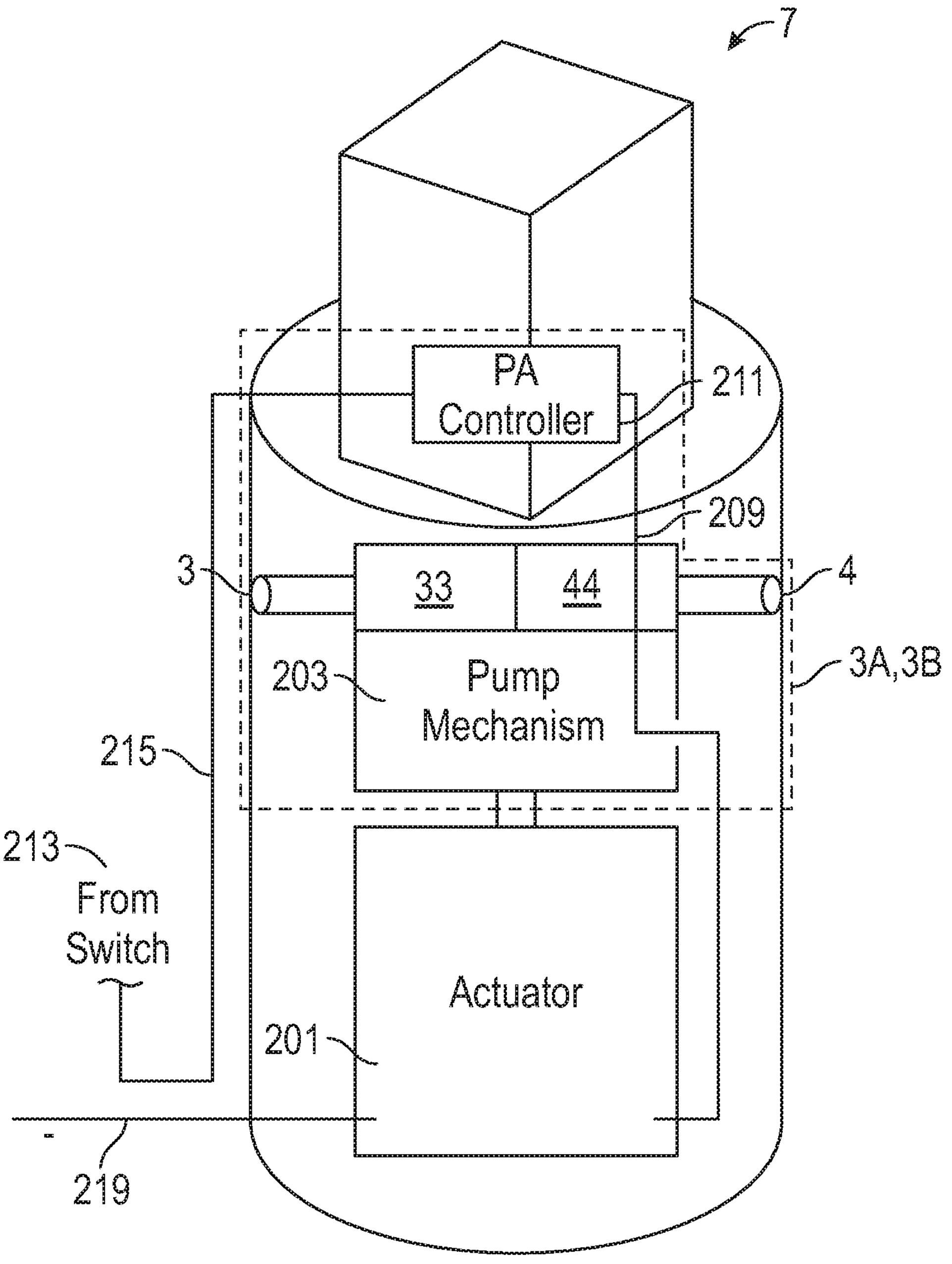
FIG. 3 shows a portion of the pump assembly of FIG. 1 in further detail.
Figure 3A:
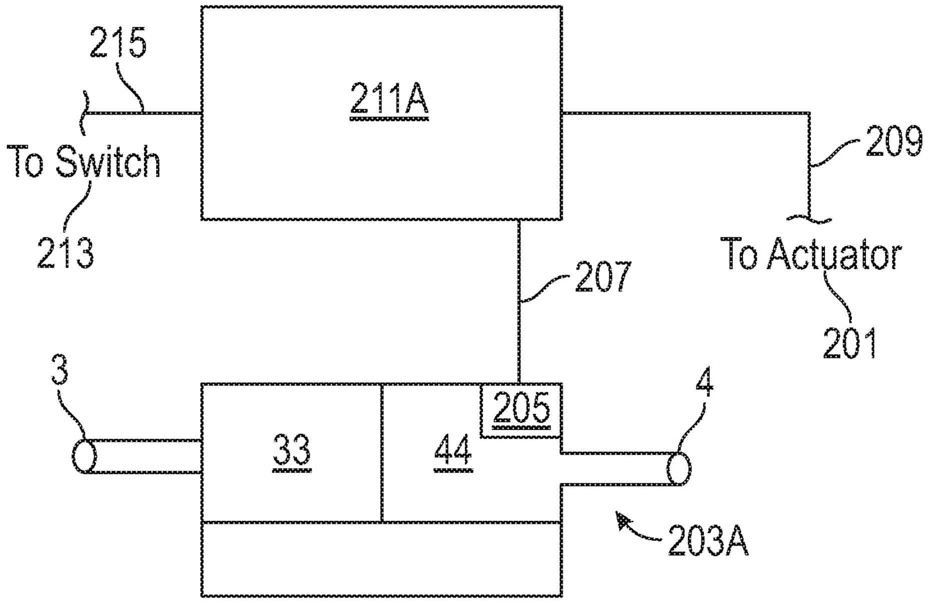
FIG. 3A shows a portion of the pump assembly of FIG. 3 in accordance with at least some embodiments in further detail.
Figure 3B:
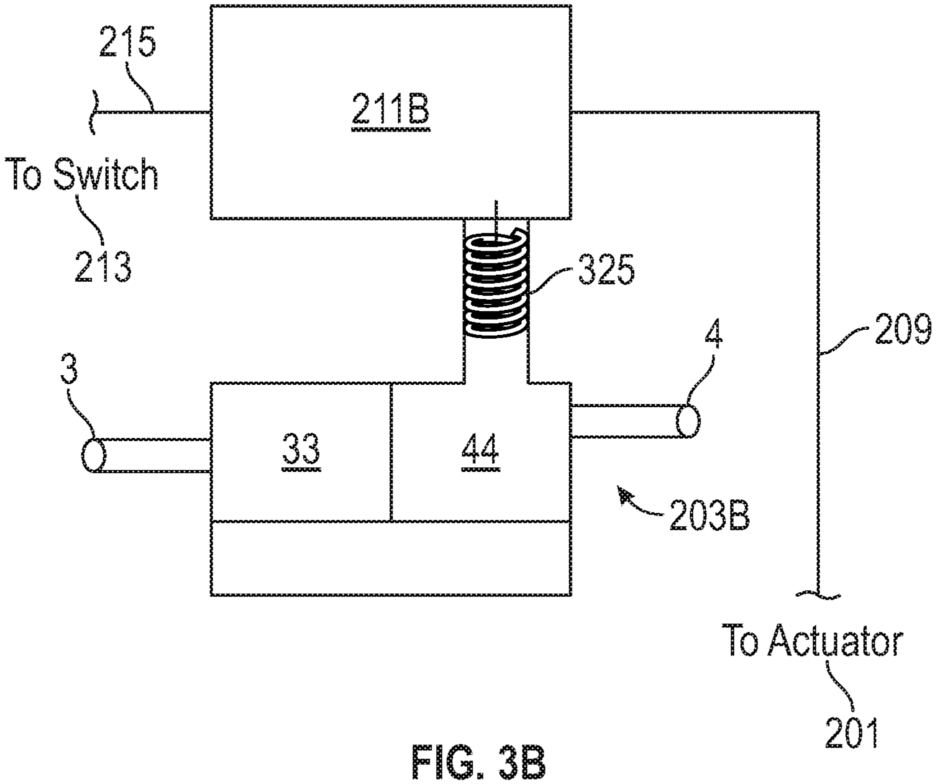
FIG. 3B shows a portion of the pump assembly of FIG. 3 in accordance with at least some other embodiments in further detail.

FIG. 3 shows pump 7 in further detail. Pump 7 includes an actuator 201 configured to drive a pump mechanism 203 that receives fluid via inlet 3 from a supply fluidly coupled to inlet 3 such a fluid volume contained in vessel 6, FIG. 2, as described above. In at least some embodiments, actuator 201 may be a solenoid and pump mechanism 203 may be a diaphragm pump mechanism. Upon the energizing of actuator 201, the received fluid is driven by pump mechanism 203 from an inlet side 33 thereof coupled to inlet 3 to an outlet side 44 thereof coupled to outlet 4 and through outlet 4 and into outlet tubing 14B (FIG. 2). Further, in alternative embodiments, pump mechanism 203 may be a centrifugal pump, a positive displacement pump, a reciprocating pump, a rotary pump, a cavity pump, a piston pump, a screw pump, a gear pump, a vane pump, a peristaltic pump, an impeller pump, a roots-type pump, a lobe pump, a plunger pump, an impulse pump, a velocity pump or an axial flow pump. Actuator 201 is energized through pressure-actuated (PA) controller 211 via line 209 as described further below in conjunction with FIGS. 3A and 3B. Electrical power is supplied via electrical wire 215 from switch 13 (FIG. 2) as described above and electrical wire 219 (designated by the "−" sign). FIGS. 3A and 3B show a portion of pump 7 in further detail in accordance with various embodiments.

In FIG. 3A, sensor 205 senses a fluid pressure at outlet side 44 of pump mechanism 203A and sends a signal 207 based on the sensed pressure to a PA controller 211A in accordance with an exemplary embodiment. For example, a voltage of signal 207 may be proportional to the sensed fluid pressure. One side of the electrical power supply (designated by the "+" sign in FIG. 2) is electrically connected to electrical wire 213 via switch 13 which, when closed, couples the power supply to a pressure-actuated (PA) controller 211A via electrical wire 215. That portion of the electrical power supply circuit is further coupled to actuator 201 when PA controller 211A is closed in response to the fluid pressure at outlet side 44 falling to a preselected first fluid pressure set point. Electrical power is then provided to actuator 201 (FIG. 3) via line 209. Conversely, PA controller 211A opens in response to the fluid pressure at outlet side 44 rising to a preselected second fluid pressure set point. The opposite side of the electrical power supply (designated by the "−" sign) is coupled to actuator 201 via electrical wire 219 (FIG. 3). It would be appreciated by those skilled in the art that the polarities denoted by the signs in FIG. 3A are arbitrary and are shown for the purpose of clarity of illustration. It would be further appreciated, that in at least some embodiments, the power supply may be an AC supply wherein the polarity of the each side of the electrical power supply alternates.

Referring to FIG. 3B, in at least some embodiments, sensor 205 may be omitted and in accordance with an exemplary embodiment a PA controller 211B may be mechanically opened and closed. In such embodiments, the first and second fluid pressure set point may be preselected by the pump manufacturer. When the fluid pressure at outlet side 44 of pump mechanism 203B in accordance with an exemplary embodiment reaches the second fluid pressure set point, a mechanical coupling, for example, a spring-loaded piston 325 fluidly coupled to outlet side 44, opens PA controller 211B turning off actuator 201 and thereby pump 7 (FIG. 3). In other embodiments, a flexible membrane may be used as an alternative to spring-loaded piston 325. Conversely, when the pressure at outlet side 44 falls below the first fluid pressure set point, the spring-loaded piston retracts, whereby PA controller 211B closes, turning on actuator 201 and thereby pump 7 (FIG. 3). In the exemplary embodiment, the first fluid pressure set point is lower than the second fluid pressure set point. Stated otherwise, in operation in conjunction with a low-flow device such as are described hereinbelow, when the PA controller 211B is opened as described above and the pump is turned off, the fluid pressure at the outlet side falls as fluid continues to flow from the low-flow device, and spring-loaded piston 325 (or similar mechanical coupling) retracts accordingly. When the fluid pressure at the outlet side 44 drops to the first fluid pressure set point, PA controller 211B closes, turning on the pump. When the fluid pressure at the outlet side 44 reaches the second fluid pressure set point, the pump is turned off as previously described. This cyclic operation of pump 7 (FIG. 3) may be referred to as a near-zero pressure cycle. PA controller 211A (FIG. 3A) in conjunction with sensor 205 operates similarly. An example of a commercially available pump that may be used in an embodiment of a pump 7 having such preselected pressure set points is a Johnson Pump AquaJetMini Model FL-2202-A diaphragm pump available from SPX FLOW, INC North Carolina, USA.

FIG. 4 shows a pump assembly 100 in accordance with another embodiment. Pump assembly 100 includes a submersible pump 7 disposed within pump housing 22. An inlet 52 may be fluidly coupled to a water supply (not shown in FIG. 4) as previously described. In this way a water level 225 may be maintained within pump housing 22 and water supplied to inlet 3 of pump 7. Further, in at least some embodiments, a heater 66 may be disposed within pump housing. Heater 66 may be electrically powered (as previously described), or, alternatively, as shown by way of example in FIG. 4, by a flame from the combustion of a gas such as natural gas, propane or butane. An external gas supply (not shown in FIG. 4) may be provided via gas inlet 12.

Figure 5:
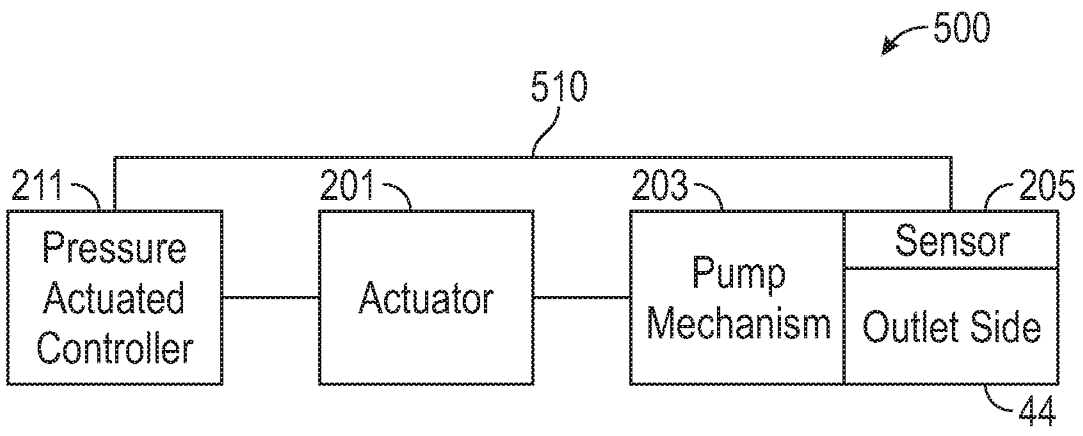
FIG. 5 shows a block diagram of a portion of a pump assembly in accordance with at least some embodiments.
Figure 6:
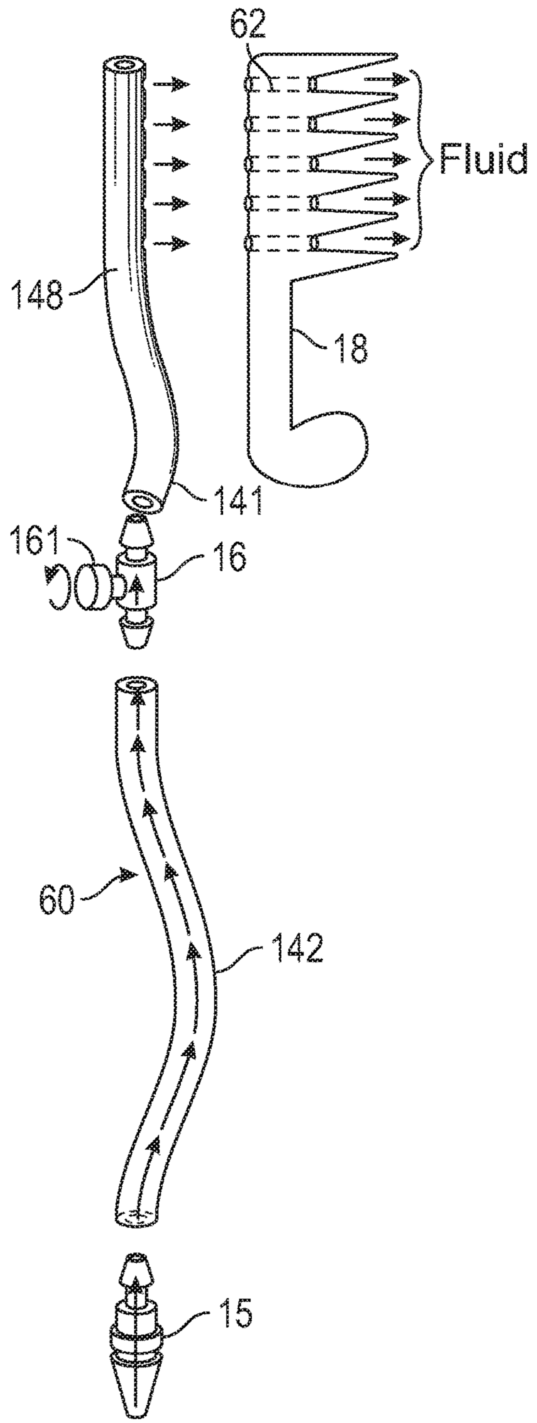
FIG. 6 shows, in an exploded view, a low-flow device in accordance with at least some embodiments.
Figure 9:
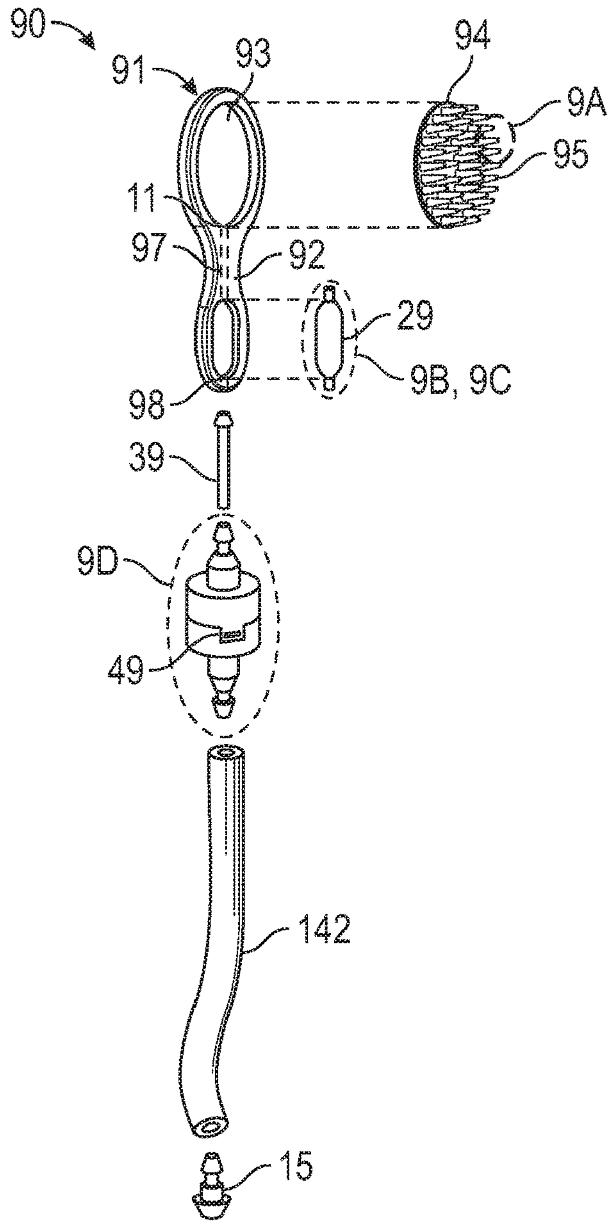
FIG. 9 shows, in an exploded view, a low-flow device in accordance with at least some embodiments.

The operation of an embodiment of a PA controller 211 will be described in conjunction with the block diagram in FIG. 5 of a portion 500 of pump 7 (FIG. 3) in accordance with at least some embodiments. Portion 500 includes a PA controller 211 coupled to an actuator 201 and provides control signals to the actuator 201. In at least some embodiments, actuator 201 may comprise a motor such as a including, by way of example, self, externally, mechanically, and electrically commutated motors such as brushed, brushless, poly phase, split phase, asynchronous, synchronous, switched reluctance, or universal, which drives pump mechanism 203. A fluid pressure sensor 205 senses the fluid pressure at the output side 44 of pump mechanism 203. Examples of a sensor 205 that may be used include, but are not limited to a strain gauge and transducers (not shown in FIG. 5) to convert a mechanical pressure or force into an electrical signal 510 representing the fluid pressure at the outlet side 44. Electrical signal 510 may be, for example, a voltage or current proportional to the fluid pressure at the outlet side 44. Signal 510 is sent to PA controller 211. Based on the measured fluid pressure, PA controller 211 activates or deactivates actuator 201, as described in the following example of the operation of portion 500 in conjunction with an attached low-flow device such as are described further below in conjunction with FIGS. 6, 7 and 9.

For the purpose of illustration, a pump, e.g. pump 7 (FIG. 3) and a low-flow device (e.g. low-flow device 70, FIG. 7) are connected with a shut-off valve or a flow valve (e.g. flow valve 16, FIG. 7) therebetween. Further, for illustrative purposes take as the initial state that the shut-off is closed and the user has turned the pump assembly on. In this state, there is not fluid flow and the fluid pressure at the outlet side 44 rises to a value that reaches the preselected second fluid pressure set point as described above. In response, PA controller 211 deactivates actuator 201, and pump mechanism 203 halts. When the user opens the shut-off valve, fluid begins to flow from the outlet side 44 to the low-flow device attached thereto (not shown in FIG. 5). Concomitantly, the fluid pressure at the outlet side drops, and continues to fall until it reaches the preselected first fluid pressure set point as described above. In response thereto, as reflected in signal 510, PA controller 211 activates actuator 201 which drives pump mechanism 203. The fluid pressure at outlet side 44 then begins to rise until it reaches the preselected second fluid pressure set point as reflected in signal 510. In response, PA controller 201 deactivates actuator 201 and pump mechanism 203 halts. The fluid pressure at outlet side 44 then cycles between the two set points (i.e. the near-zero pressure cycle) until the user opens the flow valve (not shown in FIG. 5) beyond an aperture that keeps the outlet pressure below the first fluid pressure setpoint or closes the flow valve (not shown in FIG. 5) so that the outlet pressure remains above the second fluid pressure setpoint. In accordance with the foregoing example, the user can achieve a continuous range of variable flow rates while within the "near-zero pressure cycle" condition by changing the valve aperture opening. This reduces or extends the lengths of time (phases) in which the pump is operating on or off. Opening the valve aperture extends the length of time the pump operates at it's flow rate and reduces the length of time the pump is off. Overall, this increases the average flow rate. Closing the flow valve aperture reduces the length of time the pump operates at it's flow rate and increases the length of time the pump is off. Overall, this decreases the average flow rate. The near-zero pressure cycle stops when the user opens the flow valve beyond an aperture that keeps the outlet pressure below the first fluid pressure setpoint or closes the shut-off valve aperture wherein PA controller 211 continuously activates or deactivates the pump as the case may be. Stated otherwise, PA controller 211 is configured to cycle between the first and second preselected set points unless a fluid flow rate exceeds a value wherein the fluid pressure at the outlet side remains below the first preselected fluid pressure set point, or the flow rate drops to substantially zero such that the fluid pressure at the outlet rises above the second preselected set point.

An example of a low-flow device 60 that may be used in conjunction with a pump assembly as described above is shown in an exploded view in FIG. 6. In at least some embodiments, a low flow device 60 includes a mechanical cleaning device here exemplified by a cleaning component comprising wet comb 18 attached to a perforated section of tubing 141. The perforations in tubing section 141, when fluidly coupled to channels 62, allow for the delivery of fluid to channels 62 in wet comb 18. When in use, channels 62 dispense fluid into the hair of the user. Tubing section 141 may be fluidly coupled to a flow valve 16. Flow valve 16 may include a knob 161 coupled to a variable aperture (internal to flow valve 16, not visible in FIG. 6). An example of a valve 16 that may be used in at least some embodiments is a Vari-flow valve from Ewing Irrigation and Landscape Supply, Phoenix, Ariz. In this way, the user can control the amount of fluid that is dispensed by the wet comb 18 while the fluid pressure at outlet 4 of pump 7 (FIG. 3) is maintained between preselected first and second fluid pressure set points previously described. In other embodiments, flow valve 16 may be omitted with the size of channels 62 providing the low flow at fluid pressures maintained between preselected first and second fluid pressure set points previously described. The size of channels 62, in conjunction with the variable aperture, may be selected to provide a preselected flow of fluid between the preselected first and second fluid pressure set points described above. By way of example, a size of channels 62 may be circular with a diameter in the range of 0.2 and 8 millimeters (mm) in at least some embodiments. In other embodiments, non-circular channels 62 may be used with an areal size in the range of from about 0.04 square millimeters ($mm^2$) to about 64 $mm^2$. In yet other embodiments, channels 62 may have a distribution of sizes along a length of wet comb 18. In still other embodiments, flow valve 16 may be an off-on momentary, or spring-loaded, valve that a user may use to start and stop the dispensing of fluid by low-flow device 60. Flow valve 16 may be further fluidly coupled to a tubing section 142. Tubing section 142 may be further fluidly coupled to an inlet connector 15. In yet other embodiments, an interior channel 148 of tubing section 141 may be sized such that either alone, or in combination with channels 62, such that the amount of fluid that is dispensed by the wet comb 18 is controlled while the fluid pressure at outlet 4 of pump 7 (FIG. 3) is maintained between preselected first and second fluid pressure set points previously described. For example, a cross-sectional area of channel 148 may be in the range from about 1 $mm^2$ and about 64 $mm^2$. In at least some of such embodiments, flow valve 16 may be omitted, or may be an on-off momentary valve. As described in conjunction with FIG. 8 below, inlet connector 15 may be coupled to coupler 9 (FIG. 3) of a pump assembly, for example, when low-flow device 60 is in use.

Figure 7:
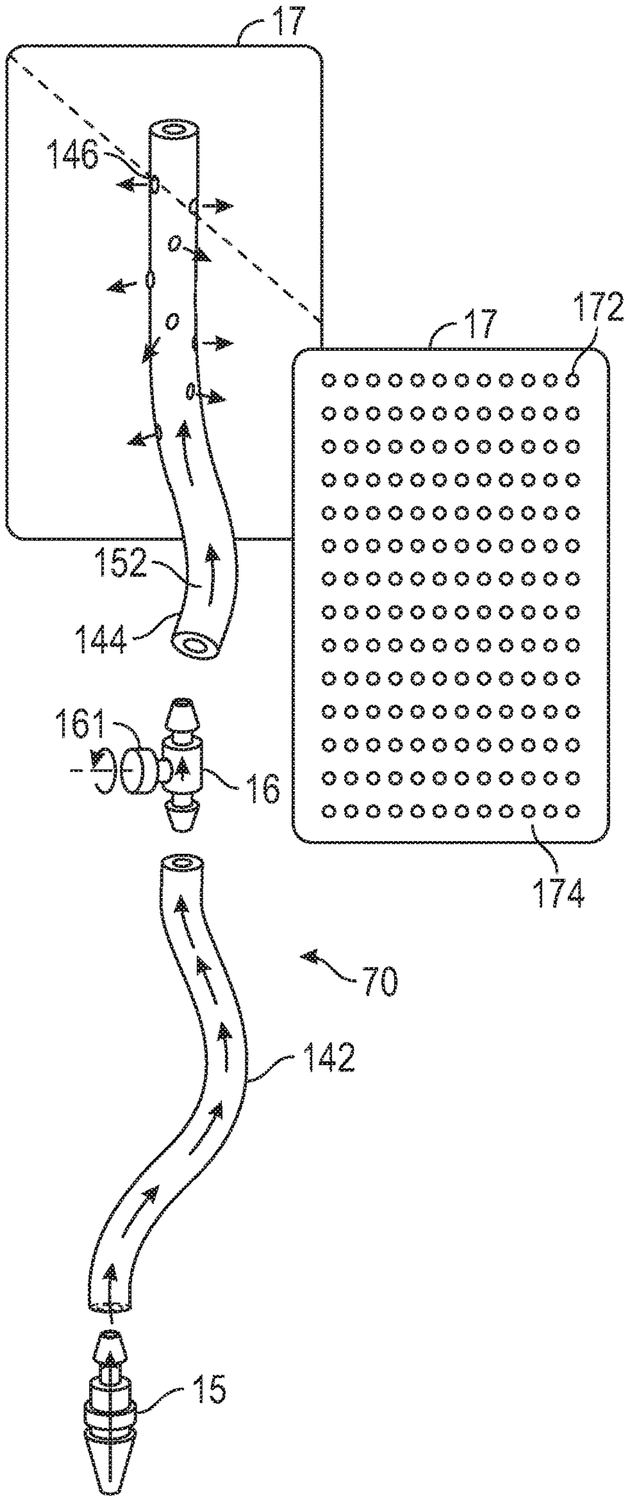
FIG. 7 shows, in an exploded view, a low-flow device in accordance with at least some embodiments.

A low-flow device 70 in accordance with another embodiment is shown in an exploded view in FIG. 7. Low-flow device 70 comprises a mechanical cleaning device exemplified by a cleaning component comprising a sponge 17 (shown in exploded view). In this example embodiment, outlet tubing 14B (FIG. 4) comprises two tubing sections 142 and 144. Fluid conveyed by tubing section 144 is emitted into sponge 17 through perforations 146 within a portion of tubing section 144 disposed within sponge 17. The emitted fluid percolates through channels 172 (shown end on) within sponge 17 to reach surface 174 of sponge 17. Similar to low-flow device 60 (FIG. 6) tubing section 144 may be fluidly coupled to a flow valve 16. The size of channels 172, in conjunction with the variable aperture of flow valve 16, previously described, may be selected to provide a preselected flow of fluid between the preselected first and second fluid pressure set points described above. By way of example, a size of pores 172 may be in the range of 0.03 $mm^2$ and 170 $mm^2$, in at least some embodiments. Flow valve 16 is then, when low-flow device 70 is in use, fluidly coupled to tubing section 142 which may then be coupled to inlet connector 15 and then to a pump assembly, such as pump assembly 1 (FIG. 1). Similar to low-flow device 60 (FIG. 6), in some embodiments, an interior channel 152 of tubing section 144 may be sized such that either alone, or in combination with pores 172, such that the amount of fluid that is dispensed by the sponge 17 is controlled while the fluid pressure at outlet 4 of pump 7 (FIG. 3) is maintained between preselected first and second fluid pressure set points previously described. For example, a cross-sectional area of channel 152 may be in the range from about 1 $mm^2$ and about 64 $mm^2$. In at least some of such embodiments, flow valve 16 may be omitted, or may be an on-off momentary valve. In some embodiments, a flow valve 16 of the on-off momentary type may be located within low flexible low-flow device such as sponge 17 and can be actuated by the end user applying a force to the low-flow device itself.

Figure 8:
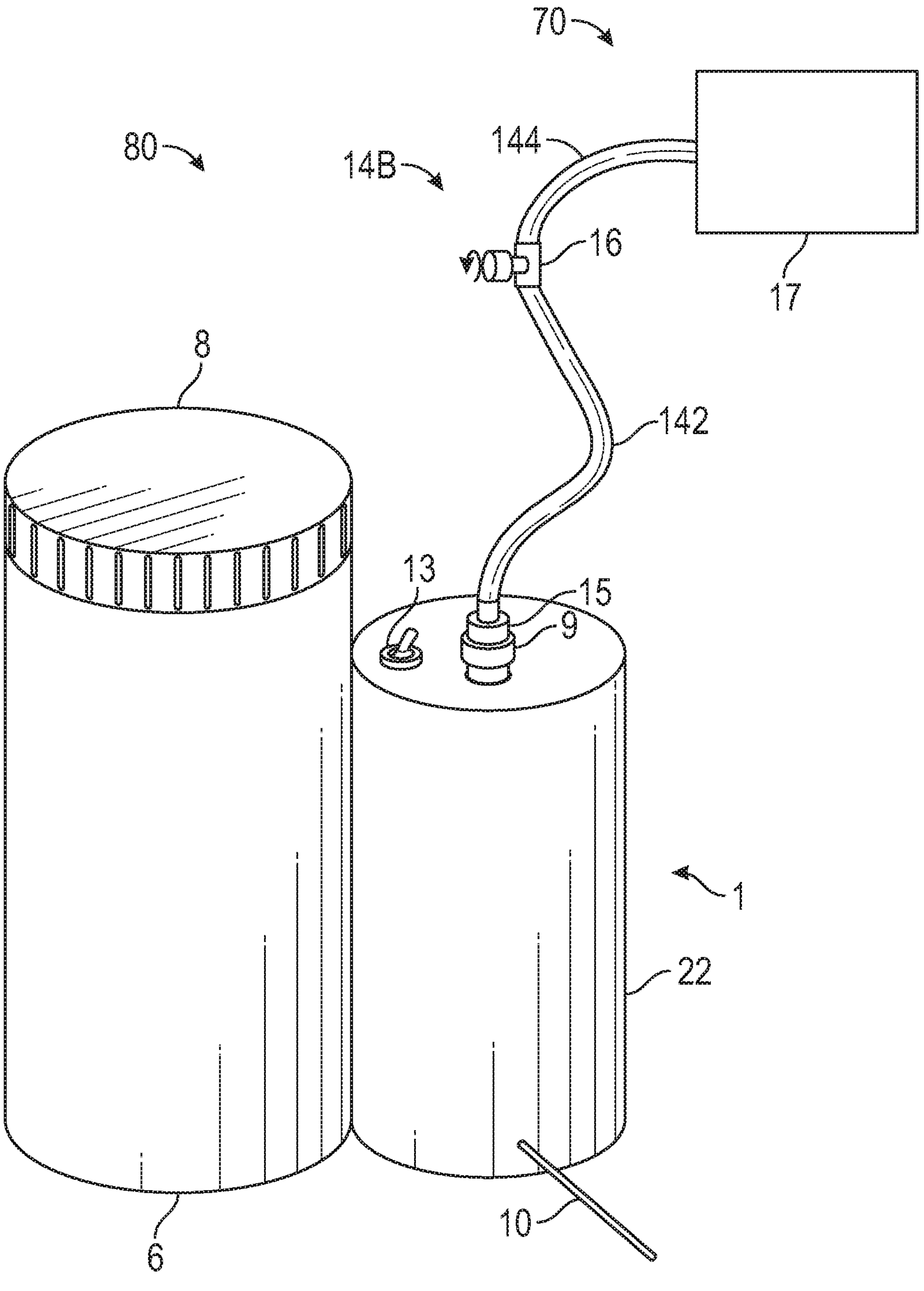
FIG. 8 shows a low-flow system in accordance with at least some embodiments.

A low-flow system 80 in accordance with at least some embodiments comprising an integrated pump assembly 1 and a low-flow device, such as low-flow device 70 is shown in FIG. 8. Although low-flow system 80 is shown with low-flow device 70 for purposes of illustration, in other embodiments, other low-flow devices may be used. Such low-flow devices may include mechanical cleaning devices such as those described in conjunction with FIGS. 6 and 7. Other mechanical cleaning devices that may similarly be used include, but are not limited to rags, poufs, wound dressings, and brushes As described above, tubing section 144 is disposed within sponge 17 and fluidly couples to flow valve 16 which is further fluidly coupled to a tubing section 142. Tubing section 142 fluidly couples to inlet connector 15 which mates with coupler 9. Pump housing 22, electrical wires 10, switch 13, vessel 6 and lid 8 are as describe hereinabove in conjunction with FIG. 1. In operation, fluid is transported to low-flow device 70 from pump assembly 1 via coupler 9, inlet connector 15 and tubing section 142.

Figure 9A:
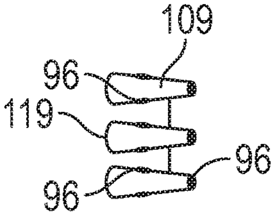
FIG. 9A shows a portion of the low-flow device of FIG. 9 in further detail.

Other mechanical cleaning devices that may similarly be used in a low-flow device include, but are not limited to rags, poufs, wound dressings and brushes. An example of a low-flow device 90 having a cleaning component comprising a brush 91 is shown in an exploded view in FIG. 9. Brush 91 includes handle 92 which is configured to fluidly couple with a fluid supply such as a pump assembly 1 (FIG. 1). Handle 92 includes a cavity 93 to receive bristle member 94 which supports hollow bristles 95 and engages with cavity 93. Cavity 93 receives a fluid from the fluid supply. FIG. 9A shows three bristles 95 which include outlets 96 which pass from an outer surface 109 of each hollow bristle 95 to an interior volume 119 of each hollow bristle 95. Interior volume 119 of each hollow bristle 95 is in fluid communication with cavity 93. A channel 97 in handle 92 provides a fluid conduit via automatic shut-off valve 29 disposed within handle 92 and in fluid communication with channel 97 and channel 98 in handle 92. Channel 97 may terminate in a fluid and/or pressure limiting outlet 11. Automatic shut-off valve 29 is a type of flow valve and will be described further in conjunction with FIGS. 9B and 9C below. In use, channel 98 is fluidly coupled to tubing section 39 which is further coupled to diffusor 49 proximal to handle 92. Diffusor 49 will be further described in conjunction FIG. 9D below. A tubing section 142 and inlet connector 15 may be fluidly coupled together to integrate low-flow device 90 with a pump assembly such as pump assembly 1 (FIG. 1) as described hereinabove.

Figure 9B:
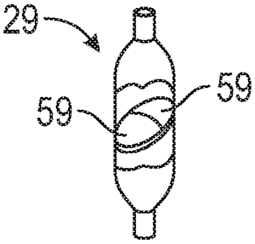
FIG. 9B shows another portion of the low-flow device of FIG. 9 in further detail.
Figure 9C:
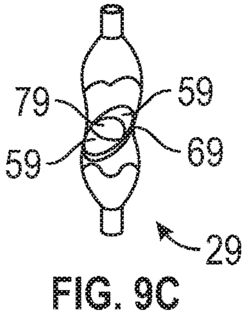
FIG. 9C shows another portion of the low-flow device of FIG. 9 in further detail.

FIGS. 9B and 9C shows, in a partial cutaway view, automatic shut-off valve 29 in its normally-closed position and its open position respectively. Stated otherwise, automatic shut-off valves include flow valves with apertures that default to the closed position. In the normally-closed position of automatic shut-off valve 29, (FIG. 9B), valve petals 59 (shown in cut-away view) abut each other to obstruct the flow of fluid through automatic shut-off valve 29. Automatic shut-off valve 29 may be constructed of a flexible material, and when automatic shut-off valve is compressed or squeezed (69, FIG. 9C), as such as by the hand of the user, valve petals 59 are separated and an aperture 79 is opened therebetween. The opening of aperture 79 allows the passage of fluid through automatic shut-off valve 29. In at least some embodiments, an automatic shut-off valve 29 may comprise a medical grade silicone, or silicone reinforced with bands of nitinol in a super elastic state.

Figure 9D:
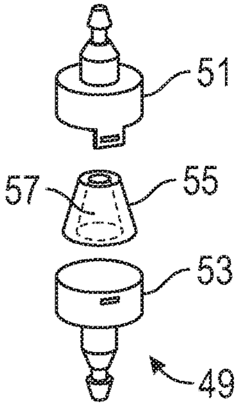
FIG. 9D shows another portion of the low-flow device of FIG. 9 in further detail.

FIG. 9D shows an exploded view of diffusor 49. Diffusor 49 includes an outlet portion 51 and an inlet portion 53. In use, outlet portion fluidly couples to tubing section 39 and inlet portion to tubing section 142. Disposed within inlet portion 53 and outlet portion 51 is a cleaning pod 55. Cleaning pod 55 includes a channel 57 passing therethrough which is in fluid communication with inlet portion 53 and outlet portion 51. Depending on the application, cleaning pod 55 may, in various embodiments, comprise agents for cleaning, protection of metal surfaces, anti-corrosive agents, anticoagulating agents, disinfectants or lather-suppressing agents. In at least some embodiments, cleaning pod 55 may be designed to dissolve in the fluid thereby dispersing the respective agent contained therein.

Figure 10:
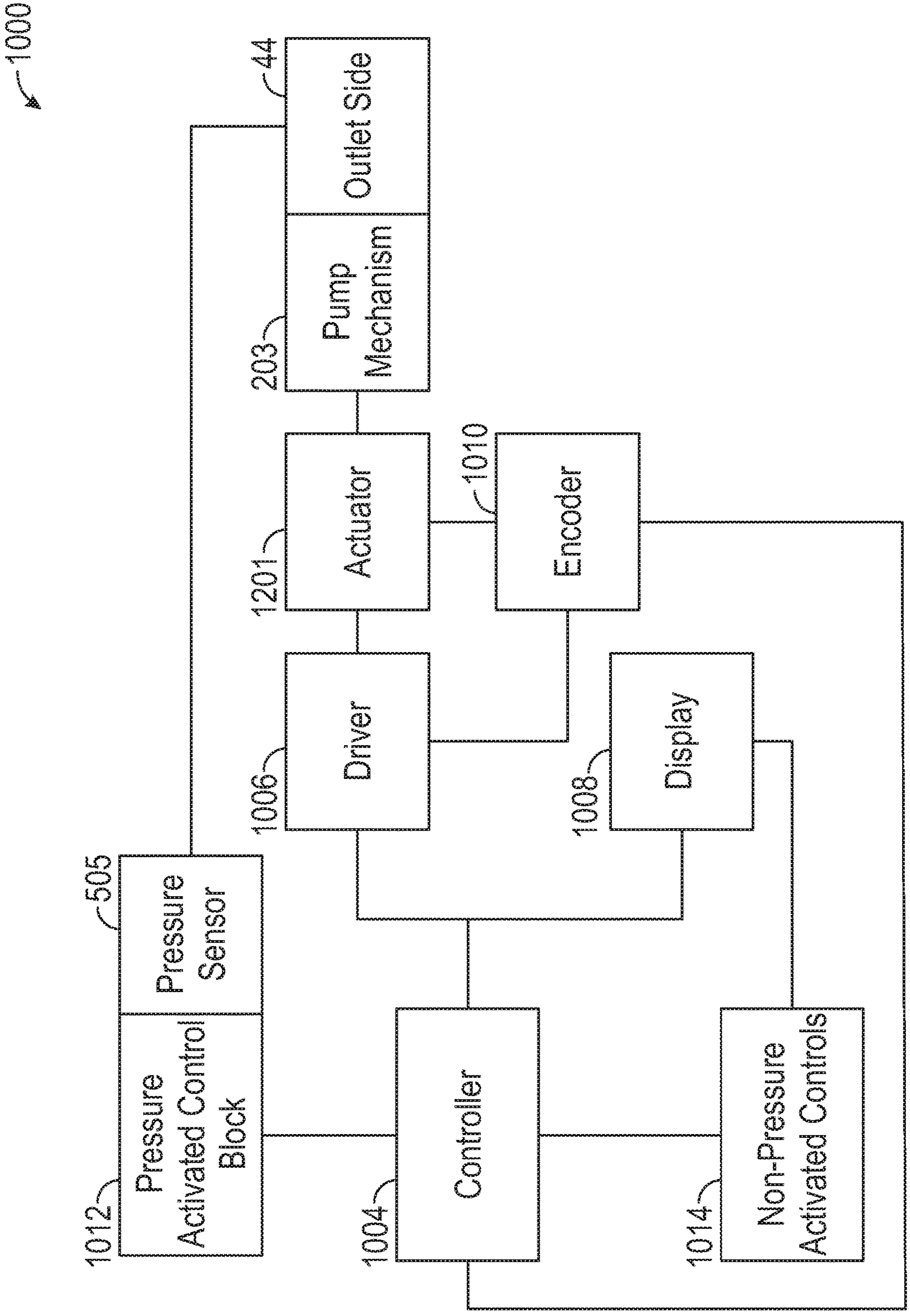
FIG. 10 shows a block diagram of a pump assembly in accordance with at least some embodiments.

In an alternative embodiment, a near-zero pressure cycle can be obtained in a pump assembly in which a controller embodiment includes multiple fluid pressure set points and flow rates. A block diagram of a pump assembly 1000 in accordance with such an embodiment is shown in FIG. 10. Pump assembly 1000 includes an actuator 1201 and pump mechanism 203 similar to pump mechanism 1 (FIG. 1). Pump mechanism 203 has an outlet side 44. Actuator 1201 mechanically drives pump mechanism 203. Actuator 1201 may, in at least some embodiments comprise a motor, including, by way of example, self, externally, mechanically, and electrically commutated motors such as brushed, brushless, poly phase, split phase, asynchronous, synchronous, switched reluctance, or universal. Other motors that may be used in embodiments of actuator 1201 can be specialty magnetic such as pancake, axial rotor, or stepper motors. Motors can be operated with DC, AC, inverted, or shaped voltage supplies. An example of a motor that may be used in an embodiment of actuator 1201 is stepper motor model 57J1854EC-1000 by Just Motion Control Electro-mechanics Co., Ltd. in Shenzen, China. Further, pump assembly 1000 includes a variable flow rate controller 1004. As described further below, controller 1004 in accordance with an embodiment provides for a preselected set of flow rates and a preselected set of fluid pressure set points. Pump assembly 1000 further includes non-pressure activated controls 1014 which communicate with controller 1004. Non-pressure activated controls 1014 are also described further below.

Fluid flows can in at least some embodiments be continuous and in at least some alternative embodiments be pulsatile. In a pulsatile flow, the fluid flow oscillates between a preselected flow rate and substantially zero flow. The relative time period for which the fluid flow is at the preselected flow rate and the relative time period for which the fluid flow is substantially zero need not be equal. Stated otherwise, a duty cycle need not be fifty percent (50%). In a pulsatile flow, when the flow rate increases or decreases, as the case may be, the flow rate switches substantially discontinuously between preselected flow rates.

Pump assembly 1000 also includes a driver 1006 and a display 1008. Display 1008 will be described further below. In at least some embodiments, display 1008 may be omitted. Controller 1004 is coupled to and receives signals from a pressure-activated (PA) control block 1012. In at least some embodiments, PA control block 1012 includes an integrated fluid pressure sensor 505 fluidly coupled to outlet side 44 of pump mechanism 203 as described above. In at least some embodiments, PA control block 1012 may be integrated with outlet side 44 and, in still other embodiments, PA control block 1012 may be omitted and sensor 505 implemented as a stand alone device. In at least some embodiments, a sensor 505 may include a strain gauge and transducers (not shown in FIG. 10) to convert a mechanical pressure or force into an electrical signal representing the fluid pressure at the outlet side 44. A sensor that may be used in at least some embodiments of a pump assembly 1000 is SS635 series water pressure sensor by Ninghai Sendo Sensor Co., Ltd. in Hangzhou, China. PA control block 1012 may then convert, level shift or digitize the fluid pressure signal into a format appropriate to controller 1004 coupled thereto. In least some embodiments, controller 1004 is programmed or otherwise configured with a preselected set of flow rates and a preselected set of fluid pressure set points. Based on the sets of flow rates and fluid pressure set points, and the sensed fluid pressure as received from PA control block 1012, controller 1004 signals driver 1006 to command actuator 1201 accordingly. Stated otherwise, driver 1006 maps an output signal from controller 1004 into a corresponding drive signal to control actuator 1201 with respect motion thereof, such as speed, direction, position or torque as the case may be. A driver 1006 may include, but is not limited to a control rectifier, current limiting chopper, variable frequency Kramer system, pulse width modulator or eddy current drive. By way of example, a driver that may be used in conjunction with a stepper as described above is a driver model 2HSS57 by Just Motion Control Electro-mechanics Co., Ltd. in Shenzen, China. In such an embodiment controller 1004 is integrated with driver 1006, however, in other embodiments discrete controllers and drivers may be used in accordance with the principles disclosed. In embodiments in which controller circuitry and driver circuitry are integrated in a device, the device may alternatively be referred to as a driver or as a controller, and a person skilled in the art would understand that the functionality of such device is equivalent to the two discrete devices. Further, in at least some embodiments, an encoder 1010 is coupled to actuator 1201, to controller 1004 and may also be coupled to driver 1006 in embodiments with a discrete driver. An encoder 1010 may communicate the activity of the actuator 1201, such as position or velocity to controller 1004. This feedback may be useful in delivering precise rates, volumes or pressures of the fluid. The feedback may also be used by controller 1006 in conjunction with driver 1006 to prevent actuator 1201 stalling or faulting. Exemplary encoders 1010 include rotary, linear, incremental absolute, magnetic or commutation encoders. Exemplary outputs of an encoder 1010 may include incremental analog or absolute digital signals.

Further, a pulsatile flow rate can result in the fluid pressure at outlet side 44 to be momentarily above or below the pressure set points associated with that flow rate. In this case, pressure sensor 505 may send a signal to controller 1004 that indicates fluid pressure at outlet side 44 is momentarily above or below the corresponding pressure set point. In this case, controller 1004 may be configured to ignore this momentary pressure condition or, alternatively use this momentary pressure condition as feedback that is compared by controller 1004 against preselected parameters. Preselected parameters may include but are not limited to pressure limits greater than the pressure set points corresponding to the flow rate. The feedback from the momentary pressure condition can be compared to the pressure limit. By way of example, the pressure limit could be the maximum pressure rating of tubing 14B (FIG. 2). If this pressure limit is exceeded, controller 1004 could, for example, de-activate an enable signal as described below in conjunction with FIG. 11 and thereby stop actuator 1201 until a user mitigates the cause of the excessive pressure. However, this momentary pressure condition will not result in initiating an alternative flow rate associated with the momentary pressure condition. The "near-zero pressure cycle" in accordance with this example embodiment resumes between two flow rates and the corresponding pressure set points until the user changes the flow valve aperture.

To further appreciate pump assembly 1000, an example operation of an embodiment having five fluid flow rates $f_1$, $f_2$, $f_3$, $f_4$, $f_5$ and fluid pressure set points $p_1$, $p_2$, $p_3$, $p_4$, $p_5$ will be described. The five fluid flow rates $f_2$, $f_3$, $f_4$, $f_5$ may be referred to as the first, second third fourth and fifth preselected flow rates, respectively, and the five fluid pressure set points as the first, second third, fourth and fifth preselected pressure set points, respectively. Such an embodiment is by way of example and in other embodiments any finite number of fluid flow rates $f_1, f_2, \ldots, f_n$ and fluid pressure set points $p_1, p_2, \ldots, p_m$ may be used in accordance with the operating principles described in conjunction with the following example. As in the foregoing example, it is not necessary that the number, n, of flow rates equal the number, m, of fluid pressure set points. Collectively these may be referred to as the set of preselected fluid flow rates and the set of preselected fluid pressure set points. In at least some embodiments, $f_1 > f_2 > \ldots > f_n$ and $p_1 < p_2 < \ldots < P_m$. Collectively, these may be referred to as the ordered set of preselected fluid flow rates and the ordered set of preselected fluid pressure set points, respectively. For the purpose of illustration, take a set of fluid flow rates corresponding to the five fluid flow rates as follows:

TABLE 1

| | |
|---|---|
| $f_1$ | 0.5 gallons per minute (gpm) |
| $f_2$ | 0.3 gpm |
| $f_3$ | 0.15 gpm |
| $f_4$ | 0.08 gpm |
| $f_5$ | 0 (flow shut off) |

and set of fluid pressure set points as follows:

TABLE 2

| | |
|---|---|
| $p_1$ | 10 pounds per square inch (psi) |
| $p_2$ | 25 psi |
| $p_3$ | 40 psi |
| $p_4$ | 55 psi. |
| $p_5$ | 60 psi. |

These values in Tables 1 and 2 are exemplary and other values may be used in accordance with the principles of the disclosure. In at least some embodiments, fluid flow rates may fall within a preselected range. For example, in at least some embodiments, the fluid flow rates may fall within the range of about 0.01 gallons per minute (gpm) to about 2.5 gpm. In at least some alternative embodiments, the fluid flow rates may fall within the range of about 2.5 gpm to about 100 gpm.

As will be described for the purpose of illustration, controller 1004 is configured, or otherwise programmed, with a preselected set of fluid pressure set points and a preselected set of fluid flow rates, as described above. The outlet side 44 of pump mechanism 203 is fluidly coupled to pressure sensor 505. Pressure sensor 505 is configured to sense the fluid pressure at the pump mechanism outlet side 44, which is sent to the controller 1004 via the pressure activated control block 1012. The controller 1004 sends control signals to driver 1006 based on the measured pressure at the outlet side 44. As previously described, the parameters are associated with the flow rate associated with the corresponding fluid pressure set points. The parameters from the controller are translated by driver 1006 into corresponding signals sent to actuator 1201 such that the desired flow rate is obtained. Stated otherwise, controller 1004 is configured with a preselected set of fluid pressure set points and one or more preselected sets of fluid flow rates. The one or more preselected sets of fluid flow rates are selected from continuous fluid flow rates and pulsatile fluid flow rates. Controller 1004 is further configured to control actuator 1201 to increase a fluid flow rate to a first flow rate corresponding to a first fluid flow rate in the preselected set of fluid flow rates when the fluid pressure at the outlet side falls to a lower one of corresponding fluid pressure set point in the preselected set of fluid pressure set points. Controller 1004 is also configured to control actuator 1201 to reduce the fluid flow rate to a second fluid flow rate corresponding to a second fluid flow rate in the preselected set of fluid flow rates, when the fluid pressure at the outlet side rises to an upper one of a corresponding fluid pressure set point in the preselected set of fluid pressure set points. In at least some embodiments, controller 1004 controls actuator 1201 via signals sent to driver 1006; driver 1006 translates the control signals to corresponding signals driving actuator 1201 to perform the commanded operation. In at least some other embodiments, controller 1004 may include integrated driver circuitry that generates the signals driving actuator 1201 based on the sensed fluid pressure at the outlet side and the preselected set of fluid flow rates and fluid pressure set points. The operation of controller 1004 in conjunction with driver 1006 will be described further hereinbelow in conjunction with FIG. 11.

Again for the purpose of illustration, take as the initial state that the shut-off valve aperture 79 (FIG. 9) is closed, the user has turned the pump (e.g. pump 7 FIG. 3) on, and the fluid pressure at the outlet side 44 is above $p_5$. Controller 1004 turns off the pump mechanism 203, via driver 1006 and actuator 1201, while the fluid pressure at the outlet side is above $p_5$ and the flow rate corresponding to flow rate $f_5$ is zero. This state will occur while the shut-off valve 29 (FIG. 9) is closed. When the user slightly opens aperture 79 (e.g. 10%), fluid begins to flow and the fluid pressure decreases toward $p_5$. When the pressure drops below $p_4$, then controller 1004 turns the pump mechanism 203 on, via driver 1006 and actuator 1201, at the lowest flow rate $f_4$. The fluid pressure will also begin to rise toward $p_5$. When the fluid pressure at the outlet side 44 exceeds $p_5$, controller 1004 shuts off the pump via driver 1006 and actuator 1201 and pump mechanism 203. So long as the user maintains this aperture opening, the pump will continue to cycle between the off state and the lowest flow rate and the fluid pressure fluctuates between $p_4$ and $p_5$.

If the user opens the shut-off valve aperture to a slightly greater extent, e.g. 15%, the fluid pressure does not exceed $p_4$. Controller 1004 maintains the flow rate at $f_4$ and the fluid pressure between $p_3$ and $p_4$.

If the shut-off valve is opened further e.g. 20%, the fluid pressure drops towards $p_3$. When the pressure drops below $p_3$, controller 1004 controls pump mechanism 203, via driver 1006 and actuator 1201, such that the flow rate changes from $f_4$ to a higher flow rate $f_3$. If the flow valve is maintained at 20%, say, and the pump operates at $f_3$, the fluid pressure will increase toward $p_4$. When the pressure increases above $p_4$, then the pump changes from the higher flow rate, $f_3$ to the lower flow rate $f_4$. The fluid pressure will decrease below $p_3$ and controller 1004 will change the pump, via driver 1006 and actuator 1201, from the lower flow rate $f_4$ to the higher flow rate $f_3$. Controller 1004 will continue to cycle the pump between these two flow rates while the flow and the fluid pressure will fluctuate between $p_3$ and $p_4$.

If the user opens the shut-off valve aperture to a slightly greater extent, e.g. 25%, the fluid pressure does not exceed $p_3$. Controller 1004 maintains the flow rate at $f_3$ and the fluid pressure between $p_2$ and $p_3$.

If the shut-off valve is opened further e.g. 30%, the fluid pressure drops towards $p_2$. When the pressure drops below $p_2$, controller 1004 controls the pump such that the flow rate changes from $f_3$ to a higher flow rate $f_2$. If the shut-off valve is maintained at 30%, say, and the pump operates at $f_2$, the fluid pressure will increase towards $p_3$. When the pressure increases above $p_3$, then the pump changes from the higher flow rate, $f_2$ to the lower flow rate $f_3$. The fluid pressure will decrease below $p_2$ and controller 1004 will change the pump from the lower flow rate $f_3$ to the higher flow rate $f_2$. Controller 1004 will continue to cycle the pump between these two flow rates while the flow and the fluid pressure will fluctuate between $p_2$ and $p_3$.

If the user opens the shut-off valve aperture to a slightly greater extent, e.g. 40%, the fluid pressure does not exceed $p_2$. Controller 1004 maintains the flow rate at $f_2$ and the fluid pressure between $p_1$ and $p_2$.

If the shut-off valve is opened further e.g. 50%, the fluid pressure drops towards $p_1$. When the pressure drops below $p_1$, controller 1004 controls the pump such that the flow rate changes from $f_2$ to a higher fluid flow rate $f_1$. If the shut-off valve is maintained at 50%, say, and the pump operates at $f_1$, the fluid pressure will increase toward $p_2$. When the pressure increases above $p_2$, then the pump changes from the higher flow rate, $f_1$ to the lower fluid flow rate $f_2$. The fluid pressure will decrease below $p_1$ and controller 1004 will change the pump from the lower fluid flow rate $f_2$ to the higher fluid flow rate $f_1$. Controller 1004 will continue to cycle the pump between these two fluid flow rates while the flow and the fluid pressure will fluctuate between $p_1$ and $p_2$.

If the pump is consistently operating at the highest fluid flow rate, e.g. $f_1$, To operate consistently, the shut-off valve aperture 79 (FIG. 9) between partially open e.g. 50%, and completely open such that the fluid pressure is below the lowest pressure set point, e.g. $p_1$. If the shut-off valve is partially closed, for example, between 40% and 50%, then the fluid pressure increases towards fluid pressure set point $p_2$. When the pressure increases above $p_2$, then the controller 1004 controls the pump, via driver 1006 and actuator 1201, to change from the existing fluid flow rate $f_1$ to a lower fluid flow rate $f_2$.

In accordance with the foregoing example, the user can obtain a range of flow rates while within the “near-zero pressure cycle” condition by changing the shut-off valve aperture opening. This reduces or extends the lengths of time (phases) in which the pump is operating in one of two settings. Both phases can co-exist within the condition with unequal lengths of time. Opening the shut-off valve aperture extends the length of time the pump operates within a higher flow rate and reduces the length of time the pump operates within the lower flow rate. Overall, this increases the average flow rate. Closing the shut-off valve aperture reduces the length of time the pump operates with in the higher flow rate and increases the length of time the pump operates within the lower flow rate. Overall, this decreases the average flow rate. The “near-zero pressure cycle” stops when the user fully closes the shut-off valve aperture wherein controller 1004 deactivates the pump via driver 1006 and actuator 1201 or, alternatively, substantially opens the shut-off valve wherein the fluid pressure remains below the lowest fluid pressure setpoint and the controller 1004 activates the pump mechanism 203 via driver 1006 and actuator 1201.

Further, non-pressure-activated controls 1014 may be provided to shut off or alter the pump or parameters within controller 1004 or driver 1006. Non-pressure activated controls 1014 may be located at points within and outside the pump assembly. Non-pressure-activated controls 1014 include but are not limited to user-adjusted switches, water-level sensors, thermostats, timers, flow-rate sensors, voltage supply regulators, inputs from a touchscreen display, and encoders which relay relevant activity from the motor such as speed or position. An exemplary non-pressure-actuated control is a float sensor 59630-1-T-02-A by Littlefuse Inc., Chicago, Ill. Such a non-pressure-actuated control when incorporated into vessel 6 (FIG. 1), for example, can signal controller 1004 that the water level is low. In response, controller 1004 can control driver 1006 to turn off actuator 1201 or operate at its lowest flow rate. Another example includes a display NHD-4.3-480272EF-ATXL#-CTP by Newhaven Display International in China presenting feedback or conditions within the system as well as include a touchscreen for the use to adjust a certain feature, function, or condition such as one of multiple pressure settings.

Figure 11:
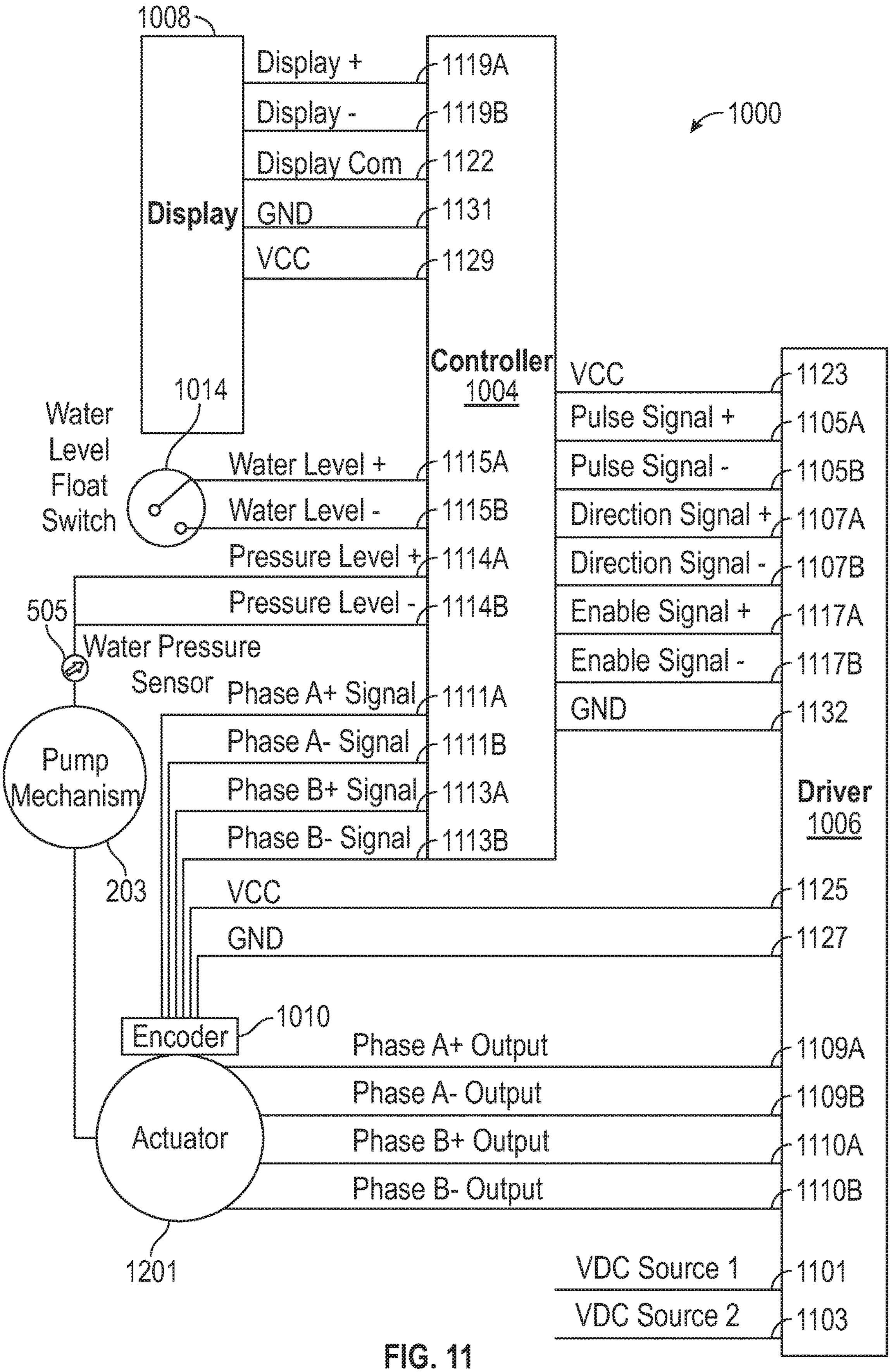
FIG. 11 shows an electrical schematic diagram of a pump assembly in accordance with at least some embodiments.

FIG. 11 shows a schematic diagram of the pump assembly 1000 in FIG. 10 in accordance with at least some embodiments based on the exemplary driver model 2HSS57 set forth above. Driver 1006 receives a set of signals from controller 1004 to control operation of actuator 1201 as described above in conjunction with FIG. 10. In accordance with the exemplary embodiment in FIG. 11, actuator 1201 is a stepper motor which may be model 57J1854EC-1000 as set forth above. Controller 1004 generates a pulse (also known as step) output 1105A, 1105B and a direction output 1107A, 1107B supplied to driver 1006. These enable driver 1006 to drive a two-phase stepper motor such as a model 57J1854EC-1000. In the multiple flow rate near zero-pressure cycle described above in conjunction with FIG. 10, the preselected set of fluid flow rates and preselected set of fluid pressure set points are mapped into a set of parameters such as pulse frequency and shapes that are programmed into controller 1004. The signal at pulse output 1105A, 1105B control the speed and increments at which actuator 1201 operates; the speed of actuator 1201 is proportional to the frequency and duty cycle of the pulse. For example, higher pulse frequency increases the speed of actuator 1201 and thereby the fluid flow rate. For a pulsatile flow rate, more stepping increases the pulsing nature of the flow. Direction signals at direction output 1107A, 1107B instruct the actuator 1201 in which direction to turn.

The outputs from controller 1004 are mapped by driver 1006 into the phase A outputs 1109A, 1109B and phase B outputs 1110A, 1110B supplied to actuator 1201. These are two-phased current pulses that are an amplification of the outputs 1105A, 1105B, 1107A, 1107B, 1117A, 1117B from controller 1004. These manifest into different motor speeds, accelerations, decelerations, directions and torques altering the pump's flow rate and pressure output accordingly.

As described above an encoder 1010 may communicate the activity of the actuator 1201, such as position or velocity to controller 1004. In the example in FIG. 11, encoder 1010 provides two phase signals, 1111A, 1111B (which may be referred to as Phase A signal) and 1113A, 1113B (which may be referred to as Phase B signal) as feedback to controller 1004. These feedback signals enable stall detection and actuator position compensation. Encoder 1010, which may be an optical encoder in at least some embodiments, indicates the position of actuator 1201. In at least some embodiments, this may comprise a position sampling feedback of 50 microseconds. This enables an accurate positioning of the actuator 1201 relative to the pulse signal from controller 1004. If the actuator position deviates from the controller pulse signal, controller 1004 auto-corrects the position in the next phase.

In the exemplary embodiment in FIG. 11, sensor 505 is coupled directly to controller 1004 without the intermediation of PA control block 1012 (FIG. 10). Sensor 505 provides an analog fluid pressure signal at pressure level inputs 1114A, 1114B of controller 1004. This fluid pressure signal, in conjunction with the preselected set of fluid pressure set points enable controller 1004 to control actuator 1201, via driver 1006, to produce the corresponding fluid flow rate in accordance with the set of preselected fluid flow rates, as previously described. Further, the fluid pressure signal may be used by controller 1004 to detect an over-pressure condition and stop actuator 1201, for example. In this aspect, controller 1004 provides an enable signal 1117A, 1117B that can override the other control signals from controller 1004 and control driver 1006 to halt actuator 1210. In at least some embodiments, controller 1004 asserts (i.e. logically true state) enable signal 1117A, 1117B in normal operation and negates (i.e. logically false state) enable signal 1117A, 1117B to halt actuator 1210. Further, a pulsatile flow rate can result in the fluid pressure at outlet side 44 to be momentarily above or below the pressure set points associated with that flow rate. In this case, pressure sensor 505 may send a signal to controller 1004 that indicates fluid pressure at outlet side 44 is momentarily above or below the corresponding pressure set point. In this case, controller 1004 may be configured to ignore this momentary pressure condition or, alternatively use this momentary pressure condition as feedback that is compared by controller 1004 against preselected parameters. Preselected parameters may include but are not limited to pressure limits greater than the pressure set points corresponding to the flow rate. The feedback from the momentary pressure condition is compared against and confirmed not to exceed the pressure limit. By way of example, the pressure limit could be the maximum pressure rating of tubing 14B (FIG. 2). If this pressure limit is exceeded, controller 1004 could, for example, negate enable signal 1117A, 1117B described above and thereby stop actuator 1201 until a user mitigates the cause of the excessive pressure. However, this momentary pressure condition will not result in initiating an alternative flow rate associated with the momentary pressure condition. The "near-zero pressure cycle" in accordance with this example embodiment resumes between two flow rates and the corresponding pressure set points until the user changes the flow valve aperture.

Further, as described above in conjunction with FIG. 10, non-pressure-activated controls may be provided. In the example embodiment in FIG. 11, control 1014 comprises a water level float switch that is coupled to water level inputs 1115A, 1115B of controller 1004. In at least some embodiments, water level float switch may comprise a reed sensor. For example, when the water level, such as water level 225 (FIG. 4) exceeds a preselected level, water-level float switch 1014 closes and, conversely, when the water level drops below such preselected level, water-level float switch 1014 opens which may signal controller 1004 to operate the pump to only run at the lowest flow rate.

Display 1008 may be a touch sensor device optionally provided to receive user input and to display information to the user. Signals from display 1008 may be coupled to controller 1004 and inputs 1119A, 1119B, which may be referred to as display+ and display− , respectively. These signals may, for example alter flow rates and pressure set points for a particular cleaning implement selected by the user. The end user could alter the preselected set points, by for example, a variety of modes/setting options on the display that are tailored for specific low-flow devices. More specifically, the user could connect a dog brush and select on the display that a dog brush is connected. This flips the controller to certain pressure set points and flow rates that are appropriate to that low flow device. Other modes presented to the user can reflect low-flow devices (e.g. a sponge which might require different flow rate and pressure setpoint parameters because the outlet sizes and valves are different. These may be presented to the user via signal 1122 which may also be referred to as Display COM which comprises a consolidated data signal from controller 1004 to provide information to the user on display 1008.

An electrical power source (not shown in FIG. 11) is coupled to driver 1006 at 1101 and 1103 referred to as VDC source 1 and VDC source 2, respectively. The electrical power supplied to driver 1006 may be conditioned by driver 1006 in accordance with the requirements of controller 1004 and provided to controller 1004 at VCC 1123 and GND 1132. Likewise encoder 1010 receives appropriately conditioned electrical power from driver 1006 at VCC 1125 and GND 1127. By way of example, in at least some embodiments, driver 1006 may supply encoder 1010 with +5VDC at a maximum current of 80 mA. Appropriately conditioned power is supplied to display 1008 via controller 1004 at VCC 1129 and GND 1131.

The above discussion is meant to be illustrative of the principles and various embodiments of the present invention. Numerous variations and modifications will become apparent to those skilled in the art once the above disclosure is fully appreciated. For example, other flow rates and pressure set point may be used. It is intended that the following claims be interpreted to embrace all such variations and modifications.

What is claimed is:

1. A hand portable apparatus comprising:

a pump having an inlet side and an outlet side, wherein the inlet side is configured to fluidly couple to a fluid supply;

a pressure sensor operably coupled to the outlet side and configured to measure a fluid pressure at the outlet side;

a pressure-actuated controller coupled to the pressure sensor, wherein the pressure-actuated controller is configured to:

turn on the pump in response to the fluid pressure at the outlet side below a first preselected pressure set point and turn off the pump in response to the fluid pressure at the outlet side above a second preselected pressure set point;

cycle between the first and second preselected set points unless a fluid flow rate at the outlet side exceeds a first value wherein the fluid pressure at the outlet side then remains below the first preselected fluid pressure set point and wherein the first preselected pressure set point is less than the second preselected pressure set point;

a sponge wherein the sponge comprises perforations; and a low-flow device coupled to the outlet side and wherein the low-flow device comprises a perforated tube with perforations about the perforated tube onto which the perforations of the sponge are coupled and wherein the sponge is configured to dispense fluid through the perforations of the sponge;

wherein the low-flow device is fluidly coupled to the sponge, the sponge is fluidly coupled to a flow valve, and the flow valve is fluidly coupled to the outlet side, wherein:

the low-flow device is configured to dispense fluid from one or more openings in the low-flow device;

the flow valve is configured to deliver a flow-rate of the fluid adjustable to any value within a preselected range from about 0.01 gallons per minute (gpm) to about 2.5 gpm when the fluid pressure at the outlet side of the pump assembly decreases to the first preselected pressure set point and remains below the second preselected pressure set point; and wherein the first value is less than about 2.5 gpm.

2. The hand portable apparatus of claim 1 wherein the flow valve is further configured to adjust the flow-rate of the fluid within the preselected range.

3. The hand portable apparatus of claim 1 wherein: the flow valve is fluidly coupled between the outlet side and the perforated tube, and the flow valve is configured to adjust the flow-rate of the fluid within the preselected range.

4. The hand portable apparatus of claim 1 wherein the first preselected fluid pressure set point is in the range from about 0.05 pounds per square inch (psi) to about 1099 psi and the second preselected fluid pressure set point is in the range from about 0.06 psi to about 1100 psi.

5. The hand portable apparatus of claim 1, wherein the areal size of the perforations of the sponge is in the range from about 0.03 square millimeters ($mm^2$) to about 170 $mm^2$.

6. The hand portable apparatus of claim 1, wherein the fluid supply includes a heating system.

7. The hand portable apparatus of claim 1, wherein the apparatus is configured to utilize 12v DC electrical power.

8. The hand portable apparatus of claim1, wherein the apparatus is operably connected to multiple power supplies and includes a user-operated switch to select between the multiple power supplies.

9. A system comprising:

a pump mechanism having an inlet side and an outlet side, wherein the inlet side is configured to fluidly couple to a fluid supply;

a pressure sensor operably coupled to the outlet side and configured to measure a fluid pressure at the outlet side;

an actuator mechanically coupled to the pump mechanism to drive the pump mechanism;

a controller coupled to the pressure sensor, wherein the controller is configured with a preselected set of fluid pressure set points and one or more preselected sets of fluid flow rates, wherein the preselected set of fluid pressure set points comprises an ordered set of fluid pressure set points, the preselected set of fluid flow rates comprises an ordered set of fluid flow rates, and the controller is further configured to:

control the actuator to increase a fluid flow rate to a first flow rate in the preselected set of fluid flow rates when the fluid pressure at the outlet side falls to a lower one of corresponding fluid pressure set point in the preselected set of fluid pressure set points;

control the actuator to reduce the fluid flow rate to a second fluid flow rate in the preselected set of fluid flow rates when the fluid pressure at the outlet side rises to an upper one of corresponding fluid pressure set point in the preselected set of fluid pressure set points;

a sponge wherein the sponge comprises perforations; and a low-flow device coupled to the sponge, the sponge fluidly coupled to the outlet side and wherein the low-flow device comprises a perforated tube with perforations about the perforated tube onto which perforations of the sponge are coupled and wherein the sponge is configured to dispense fluid through the perforations of the sponge, through the sponge perpendicular to a surface of the sponge; and a flow valve configured to deliver a flow rate of the fluid adjustable to any value within a preselected range from about 0.01 gpm to about 2.5 gpm, and wherein the first flow rate is less than about 2.5 gpm.

10. The system of claim 9 wherein:

when the fluid flow comprises a continuous fluid flow rate, when reduced, is continuously reduced to the second flow rate, and, when increased, is continuously increased to the first flow rate; and when the fluid flow comprises pulsatile flow, the fluid flow rate when reduced, is switched to the first flow rate and, when increased, is switched to the second flow rate.

11. The system of claim 9 wherein the controller includes a driver configured to receive signals from the controller and map the signals to respective drive signals coupled to the actuator.

12. The system of claim 9 further comprising a driver coupled to the controller, the driver configured to receive signals from the controller and map the signals to respective drive signals coupled to the actuator.

13. The system of claim 9, wherein the areal size of the perforations of the sponge is in the range from about 0.03 square millimeters ($mm^2$) to about 170 $mm^2$.

14. The system of claim 9, wherein the fluid supply includes a heating system.

15. The system of claim 9, wherein the system is configured to utilize 12v DC electrical power.

16. The system of claim 9, wherein the system is operably connected to multiple power supplies and includes a user-operated switch to select between the multiple power supplies.

* * * * *